United States Patent
Itaya (10) Patent No.: US 10,495,810 B2
(45) Date of Patent: Dec. 3, 2019

(54) PLANAR LIGHT SOURCE DEVICE AND LIQUID CRYSTAL DISPLAY APPARATUS

(71) Applicant: NLT TECHNOLOGIES, LTD., Kanagawa (JP)

(72) Inventor: Hideki Itaya, Kanagawa (JP)

(73) Assignee: TIANMA MICROELECTRONICS CO., LTD., Shenzhen (CN)

(*) Notice: Subject to any disclaimer, the term of this patent is extended or adjusted under 35 U.S.C. 154(b) by 88 days.

(21) Appl. No.: 15/022,659

(22) PCT Filed: Sep. 18, 2013

(86) PCT No.: PCT/JP2013/075172
§ 371 (c)(1),
(2) Date: Mar. 17, 2016

(87) PCT Pub. No.: WO2015/040699
PCT Pub. Date: Mar. 26, 2015

(65) Prior Publication Data
US 2016/0231502 A1    Aug. 11, 2016

(51) Int. Cl.
 G02F 1/1333    (2006.01)
 F21V 8/00    (2006.01)
 G02F 1/1335    (2006.01)

(52) U.S. Cl.
 CPC .......... *G02B 6/0091* (2013.01); *G02B 6/009* (2013.01); *G02B 6/0088* (2013.01);
 (Continued)

(58) Field of Classification Search
 CPC .... G02B 6/0091; G02B 6/009; G02B 6/0088; G02B 6/0055; G02F 1/133308;
 (Continued)

(56) References Cited

U.S. PATENT DOCUMENTS 7,160,019 B1 * 1/2007 Kawakami .......... G02B 6/0055
  362/609
8,167,476 B2   5/2012 Sakamoto et al.
(Continued)

FOREIGN PATENT DOCUMENTS

CN   1470918 A    1/2004
CN   101684908 A   3/2010
(Continued)

OTHER PUBLICATIONS

International Search Report, PCT/JP2013/075172, dated Dec. 24, 2013.
(Continued)

*Primary Examiner* — Paisley L Arendt
*Assistant Examiner* — Mariam Qureshi
(74) *Attorney, Agent, or Firm* — Young & Thompson (57) ABSTRACT

A planar light source device includes at least a light guide plate and a lamp unit disposed replaceably at a side surface of the plate. The lamp unit includes: a lamp holder having a shape where a surface facing the side surface of the light guide plate is opened; an LED mounted on a flexible cable, the cable fixed on an inner surface of the lamp holder; and a shielding sheet fixed on an outer surface of the lamp holder. An upper portion of the lamp holder located close to a light emitting surface of the light guide plate does not overlap its light emitting surface when viewed from a normal direction of the light emitting surface. One end of the shielding sheet is fixed to the upper portion of the lamp holder, the other end being closely attached to the light emitting surface of the light guide plate.

9 Claims, 5 Drawing Sheets

(52) U.S. Cl.
CPC .. *G02F 1/133308* (2013.01); *G02F 1/133615* (2013.01); *G02B 6/0055* (2013.01); *G02B 6/0083* (2013.01); *G02F 2001/133322* (2013.01); *G02F 2201/54* (2013.01)

(58) Field of Classification Search
CPC ........... G02F 1/133615; G02F 2201/54; G02F 2001/133322
See application file for complete search history.

(56) References Cited

U.S. PATENT DOCUMENTS

| | | | |
|---|---|---|---|
| 2003/0179580 A1* | 9/2003 | Ito | G02B 6/0055 362/306 |
| 2004/0021806 A1 | 2/2004 | Ohizumi et al. | |
| 2008/0180972 A1* | 7/2008 | Sakamoto | G02B 6/009 362/613 |
| 2009/0268124 A1* | 10/2009 | Kujiraoka | G02B 6/0091 349/61 |
| 2010/0079697 A1 | 4/2010 | Park et al. | |
| 2012/0268379 A1* | 10/2012 | Yoshioka | H01H 13/83 345/168 |

FOREIGN PATENT DOCUMENTS

| | | |
|---|---|---|
| JP | 2001-052520 | 2/2001 |
| JP | 2003-346535 | 12/2003 |
| JP | 2005-158669 | 6/2005 |
| JP | 2007-80802 | 3/2007 |
| JP | 2007-149501 | 6/2007 |
| JP | 2008-034287 | 2/2008 |
| JP | 2008-186780 | 8/2008 |
| JP | 2009-80947 | 4/2009 |
| WO | 2012102193 A1 | 8/2012 |
| WO | WO 2012/128063 | 9/2012 |

OTHER PUBLICATIONS

Japanese Official Action—2015-537490—dated Aug. 1, 2017.
Japanese Office Action issued in Application No. 2015-537490, dated Feb. 20, 2018 with English Translation.
Chinese Office Action issued in Application No. 201380079704.6, dated Mar. 5, 2018 with English Translation.

* cited by examiner

PLANAR LIGHT SOURCE DEVICE AND LIQUID CRYSTAL DISPLAY APPARATUS

CROSS-REFERENCE TO RELATED APPLICATION

This application is the national phase under 35 U.S.C. § 371 of PCT International Application No. PCT/JP2013/075172 which has an International filing date of Sep. 18, 2013 and designated the United States of America.

FIELD

The present invention relates to a planar light source device and a liquid crystal display apparatus. More specifically, the present invention relates to an edge-light-type planar light source device using an LED (Light Emitting Diode) as a light source, and a liquid crystal display apparatus where the planar light source device is mounted thereon.

BACKGROUND

An LED is used as a light source of a liquid crystal display apparatus, and thus, in order to adapt to the thinning of the liquid crystal display apparatus, in many case, the LED used as the light source has thickness dimensions of 0.6 mm or 0.8 mm. The LED is a point light source, and in the liquid crystal display apparatus, since the point light source needs to be converted into a planar light beam, a light guide plate formed in a planar shape or a wedge shape by using acryl or polycarbonate as a material is used.

In addition, the display apparatus requires specifications capable of being continuously used for a long time period according to the use thereof. On the other hand, the light source used for the liquid crystal display apparatus has characteristics that the strength of the light source, that is, the brightness as the display apparatus is decreased due to long-time lighting or its use environment. As a method of solving this problem, in product specifications, a light source unit is configured to have a structure of being separable from the display apparatus and when the brightness as the display apparatus is decreased, only the light source unit is replaced.

Figure 1:
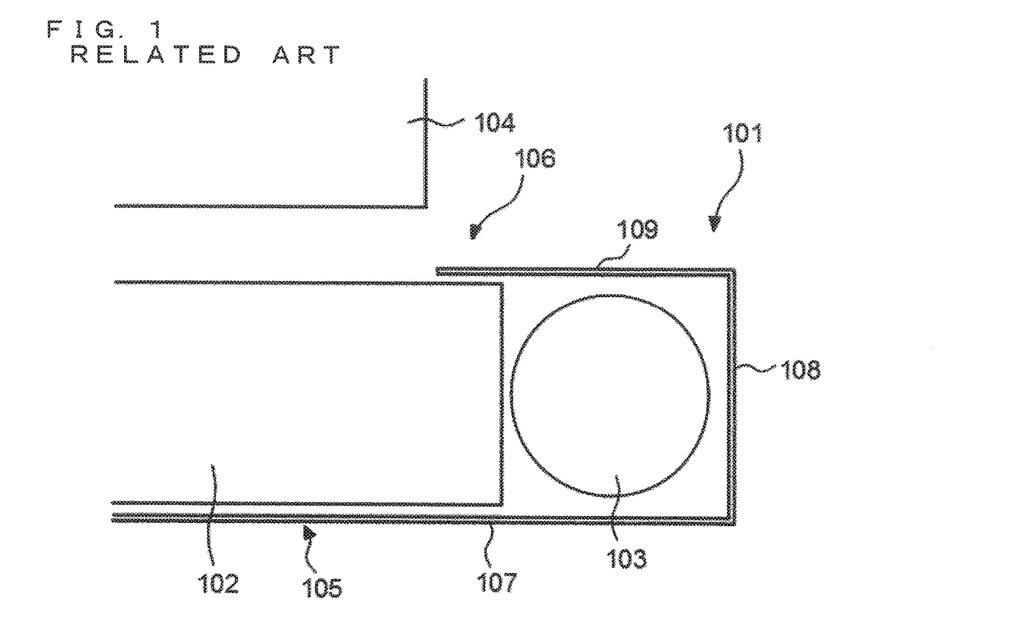
FIG. 1 is a sectional view illustrating a structure of a light unit according to a related art (Japanese Patent Application Laid-Open No. 2008-034287)
Figure 2:
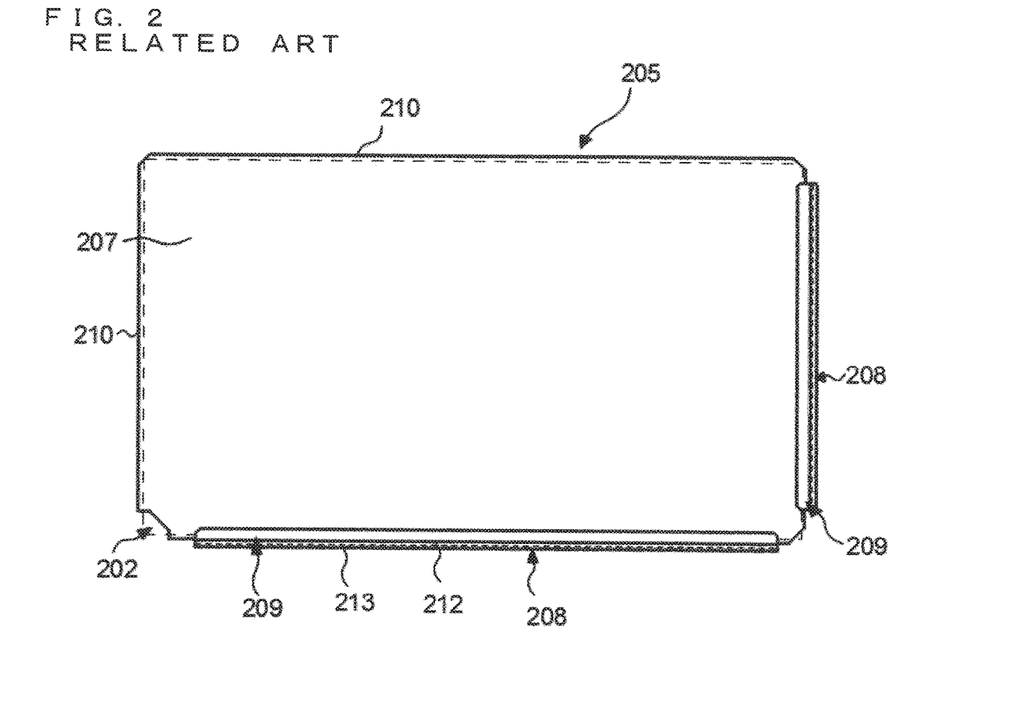
FIG. 2 is a plan view illustrating a structure of a reflector of a light unit according to a related art (Japanese Patent Application Laid-Open No. 2005-158669)

Although it is not a technique relating to a liquid crystal display apparatus using an LED as a light source, a related art relating to a liquid crystal display apparatus using a cold-cathode tube (CCFL: Cold Cathode Fluorescent Lamp) as a light source will be described with reference to the drawings. FIG. 1 is a sectional view of a light unit according to Related Art 1. FIG. 2 is a plan view illustrating a reflector of a light unit according to Related Art 2, and FIG. 3 is a sectional view of the light unit according to Related Art 2.

As a related art (Japanese Patent Application Laid-Open No. 2008-034287) relating to the light unit having a structure where the light source unit is replaceable, there is a light unit 101 as illustrated in FIG. 1. The light unit 101 includes a light guide plate 102, and a CCFL 103 is provided at the side surface of the light guide plate 102. In addition, in order to allow irradiation light to be efficiently incident on the light guide plate 102, the light unit 101 includes a reflector 105 which is configured with a PET (polyethylene terephthalate) resin plate, a stainless steel plate, or the like.

The reflector 105 is formed so that the light guide plate 102 is pinched by reflection walls 107 and 109. A portion of the light emitting surface 106 of the light guide plate 102 is covered with the reflection wall 109 so that light leakage, which is directly emitting of the irradiation light from the CCFL 103 without passing through the light guide plate 102 toward a liquid crystal display panel 104, is prevented. In addition, in the light unit 101, by sliding the reflection walls 107, 108, and 109 against the light guide plate 102, the worn-out CCFL 103 and reflector 105 can be detached.

Figure 3:
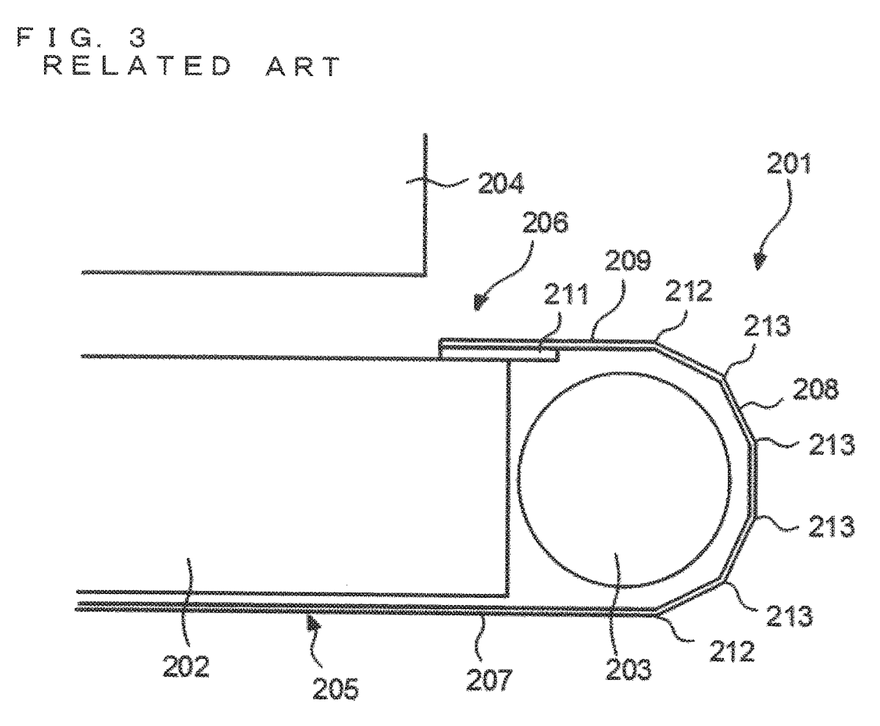
FIG. 3 is a sectional view illustrating a structure of the light unit according to the related art (Japanese Patent Application Laid-Open No. 2005-158669)

In addition, as a related art (Japanese Patent Application Laid-Open No. 2005-158669) relating to the light unit having a structure of preventing light leakage, there is a light unit 201 as illustrated in FIGS. 2 and 3. The light unit 201 includes a light guide plate 202, and a CCFL 203 is provided at the side surface of the light guide plate 202. In addition, in order to allow irradiation light to be efficiently incident on the light guide plate 202, the light unit 201 includes a reflector 205 which is configured with a PET resin plate, a stainless steel plate, or the like.

The reflector 205 is formed so that an edge portion of the light guide plate 202 close to a light source is covered with reflection walls 207, 208, 209, and 210. The reflection wall 208 is bent at a boundary line 212 from the reflection walls 207 and 209 and is configured in a shape along the peripheral surface of the CCFL 203 by a bending groove 213. Particularly, the edge portion of the light emitting surface 206 of the light guide plate 202 is covered with the reflection wall 209, so that light leakage, which is directly emitting of the irradiation light from the CCFL 203 without passing through the light guide plate 202 toward a liquid crystal display panel 204, is prevented. In addition, a light-shielding sheet 211 is provided on the reflection wall 209. In a case where a portion of the reflection wall 209 facing the edge portion of the light guide plate 202 close to the CCFL 203 is intensively irradiated, the light to be reflected by the portion is reduced by the light-shielding sheet 211, so that uniformity of the brightness is improved.

SUMMARY

In some cases, due to the characteristics of the material, the light guide plate may involve deformation such as warp according to an environmental condition such as heat or moisture or a condition of forming the light guide plate. Particularly, in a liquid crystal display apparatus employing an LED, since the thickness of the light guide plate is generally set to be equal to or smaller than the thickness of the LED, in a case where the light guide plate is thinned according to the thinning of the LED, the warp of the light guide plate is increased.

The LED is a semiconductor device lighting according to supply of current. If a supplied amount of current is increased, power consumption of the semiconductor device is increased, and thus, a self-heating amount is also increased. Since the self-heating causes a deterioration in performance of the LED, that is, a decrease in amount of light which can be emitted and a decrease in brightness, in order to reduce the influence of the self-heating on the performance, in some cases, the LED may be used in the state where the LED is fixed to a part formed with a metal material such as aluminum. In addition, in the case of realizing a light source unit having a replaceable structure, generally, the LED is mounted on a flexible cable and the flexible cable is fixed to a metal part by a double-sided tape or the like. In order to efficiently supply the light emitted from the LED to the light guide plate, the surface of the metal part is covered with a material having a good reflection efficiency and the shape thereof is configured to be a U-shape pinching the light guide plate. By sliding the metal part inside the device, the replacement of the light source unit is performed.

In this manner, in the structure capable of replacing the light source unit by sliding the U-shaped metal part, a reflection surface or a light emitting surface of the light guide plate or both surfaces thereof serve as a guide for sliding the light source unit. Therefore, like the related art, in a structure where an end portion of a metal part is in direct connect with the light guide plate, the metal part scrapes a light emitting surface of the light guide plate and thus, the scraped fragments enter a display area of the display apparatus to be extraneous substances of display, so that display quality is decreased. In addition, in a case where both of the reflection surface and the light emitting surface of the light guide plate are used as a guide, that is, in a case where the U-shaped metal part pinches the light guide plate, if deformation such as warp occurs in the light guide plate, it is difficult to slide the light source unit.

In addition, in order to solve this problem, if a structure where the opening of the U-shape is widened or a structure where one end portion of the U-shaped part does not overlap with the light guide plate is used, light leaks from a gap formed between the light emitting surface of the LED and the side surface of the light guide plate facing the light emitting surface of the LED to the outside without being incident on the light guide plate. Therefore, due to this light leakage, display irregularity that the vicinity of the light source unit is seen to be bright occurs.

An aspect of the present invention is a planar light source device comprising at least a light guide plate and a lamp unit which is disposed replaceably at a side surface of the light guide plate. The lamp unit includes: a lamp holder having a shape where a surface facing the side surface of the light guide plate is opened; an LED as a light source; a flexible cable on which the LED is mounted and which is adhered to be fixed on an inner surface of the lamp holder; and a shielding sheet which is adhered to be fixed on an outer surface of the lamp holder. The lamp holder is formed so that an upper portion located close to a light emitting surface of the light guide plate does not overlap with the light emitting surface of the light guide plate when viewed from a normal direction of the light emitting surface. The shielding sheet has one end which is fixed to the upper portion of the lamp holder, and the other end which is closely attached to the light emitting surface of the light guide plate.

It is to be understood that both the foregoing general description and the following detailed description are exemplary and explanatory and are not restrictive of the invention.

DETAILED DESCRIPTION

As described in BACKGROUND, if an LED having a small size in the thickness direction is used for a light source of a backlight in order to implement thinning of a liquid crystal display apparatus, a light guide plate needs to be thinned in accordance with the size of the light emitting surface of the LED. Although a transparent resin material such as acryl or polycarbonate is generally used for the light guide plate of the backlight, in some cases, the light guide plate may involve deformation such as expansion or warp according to an environmental condition such as heat or moisture or a condition of forming the light guide plate, the occurrence of the deformation tends to be increased by the thinning of the light guide plate.

In addition, in a liquid crystal display apparatus including backlight using a replaceable edge light unit as a light source, a lamp holder having a shape (U-shape) covering an end portion of the light guide plate is used. However, in the structure where the end portion of the light guide plate is covered, at the time of replacing the edge light unit, since the light guide plate and the lamp holder are in contact with each other, the light emitting surface of the light guide plate is scraped by the lamp holder, and thus, the scraped fragments become extraneous substances of display, so that display quality is deteriorated. In addition, in the structure where the end portion of the light guide plate is covered, if the deformation such as expansion or warp of the light guide plate occurs, there is a problem in that it is difficult to perform insertion or removal of the lamp holder into or from the backlight.

In addition, if the opening of the U-shape is configured to be widened or one end portion of the U-shaped part is configured not to overlap with the light guide plate in order to solve the above-described problem, light leaks from a gap formed between the light source and the side surface of the light guide plate, and thus, display irregularity occurs.

Therefore, in an embodiment, in a planar light source device where an edge light unit using an LED as a light source is replaceable, a U-shaped lamp holder, an LED fixed to an inner surface of the lamp holder, and a shielding sheet fixed to an outer surface of the lamp holder are provided in the lamp unit disposed at the side surface of the light guide plate so that the upper surface of the U-shaped lamp holder does not overlap with light emitting surface of the light guide plate and the other end of the shielding sheet fixed on the upper surface of the lamp holder is closely attached to the light emitting surface of the light guide plate.

That is, a metal member (lamp holder) having a U-shaped cross section is formed so as not to overlap with a light emitting surface of a light guide plate, a flexible shielding sheet formed with a material being softer than the light guide plate is adhered to an end portion of the metal member close to the light emitting surface of the light guide plate, and thus, the shielding sheet is closely attached to the light emitting surface of the light guide plate.

In this manner, since the metal member is not in direct contact with the light guide plate, the occurrence of the scraped fragments of the light guide plate according to the sliding of the metal member at the time of replacing the light source unit can be prevented, so that a deterioration in display quality can be suppressed. In addition, since the flexible shielding sheet is used, workability at the time of replacing the light source can be improved even if the deformation such as expansion or warp of the light guide plate occurs. In addition, since the shielding sheet is closely attached to the light emitting surface of the light guide plate, light leakage from the gap formed between the light source and the side surface of the light guide plate can be prevented, so that a deterioration in display quality can be suppressed.

Accordingly, in the structure where the edge light unit using the LED as a light source is replaceable, a deterioration in display quality caused by warp of the light guide plate can be suppressed and replacement work can be easily performed.

In addition, the positions of the LED as a light source and the side surface of the light guide plate are shifted in the thickness direction due to the deformation of the light guide plate, and in a case where the position shift occurs, the portion where the light emitted from the LED is not efficiently incident on the light guide plate is generated (light leakage occurs). Therefore, in a case where the deformation of the light guide plate is large, the luminance of the backlight is decreased.

Therefore, in an embodiment, in a frame disposed between the backlight and the liquid crystal display panel, a convex portion or protrusion (rib) projecting toward the light emitting surface of the light guide plate is provided at a position of the frame corresponding to the end portion of the light emitting surface of the light guide plate, so that the shielding sheet is allowed to be pressed toward the light emitting surface of the light guide plate.

In this manner, since the rib which presses the shielding sheet toward the light emitting surface of the light guide plate is provided in the frame disposed close to the light emitting surface of the light guide plate, the adhesion between the light emitting surface of the light guide plate and the shielding sheet is increased, and the shielding sheet is securely closely attached to the light guide plate. Therefore, the light leakage from the gap formed between the light source and the side surface of the light guide plate can be securely prevented, and a decrease in luminance and a deterioration in display quality caused by position shift between the light source and the side surface of the light guide plate can be suppressed.

(Embodiment 1)

Figure 4:
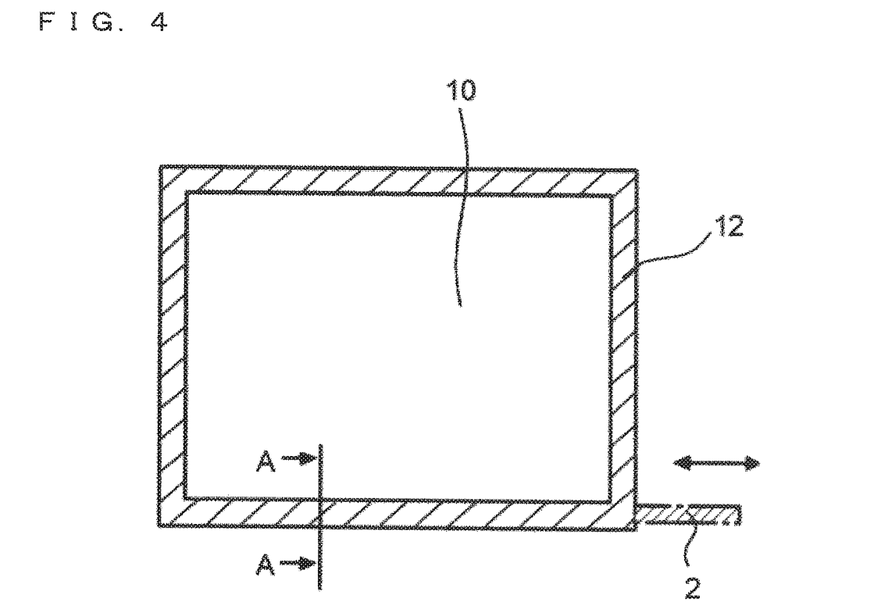
FIG. 4 is a front view illustrating an external structure of a liquid crystal display apparatus including a planar light source device according to Embodiment 1.
Figure 5:
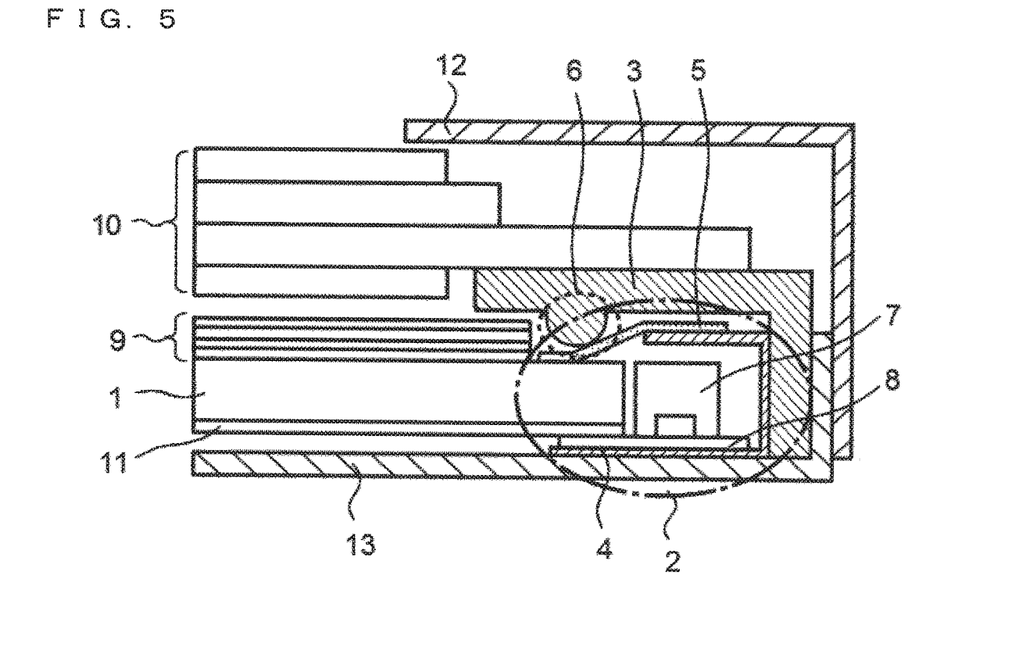
FIG. 5 is a sectional view illustrating a structure of a light source unit of the planar light source device according to Embodiment 1.
Figure 6:
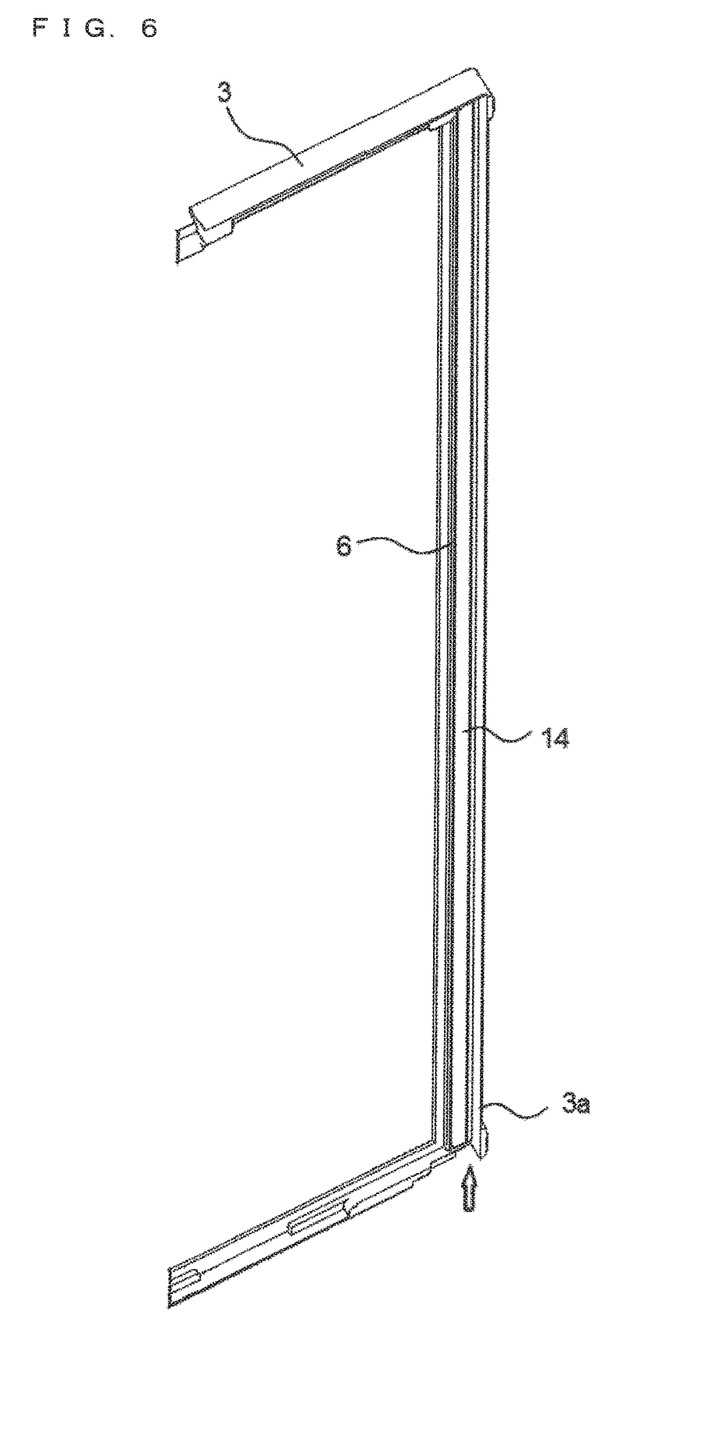
FIG. 6 is a perspective view of a frame of the planar light source device according to Embodiment 1 seen from back side.

In order to describe the above-described embodiment in detail, the following will describe a planar light source device and a liquid crystal display apparatus according to Embodiment 1 with reference to FIG. 4 to FIG. 6.

FIG. 4 is a front view illustrating an external structure of a liquid crystal display apparatus including a planar light source device according to Embodiment 1. The liquid crystal display apparatus according to Embodiment 1 includes a liquid crystal display panel 10, a backlight (not illustrated) having a lamp unit 2 which can be inserted and removed, and a frame which holds the above members (in FIG. 4, only a front frame 12 provided from a display surface side of the liquid crystal display panel 10 is illustrated). The liquid crystal display apparatus can perform display by illuminating the liquid crystal display panel 10 with the backlight (planar light source device).

FIG. 5 is a sectional view taken along line A-A of FIG. 4. The liquid crystal display panel 10 is configured with a TFT (Thin Film Transistor) substrate and a CF (Color Filter) substrate sandwiching a liquid crystal layer, polarizing plates disposed at both outer sides of a pair of the substrates, and the like. The liquid crystal display panel 10 is disposed at the light emitting surface side of the light guide plate 1 of the backlight (planar light source device). Since the present invention is characterized in the structure of the planar light source device, the structure of the liquid crystal display panel 10 is not particularly limited.

In addition, the backlight includes: the light guide plate 1 formed with a transparent resin material such as acryl or polycarbonate; a reflection sheet 11 disposed at a reflection surface side of the light guide plate 1 (lower side in the figure): an optical sheet 9 including a diffusion sheet, a lens sheet and the like, disposed at the light emitting surface side of the light guide plate 1 (upper side in the figure): and a lamp unit 2 disposed at the side surface of the light guide plate 1 (refer to the inside of an area indicated by an alternate long and short dashed line in the figure).

A frame 3 formed with a resin or the like is disposed so as to cover the end portion of the light guide plate 1 and the lamp unit 2 from the light emitting surface side of the backlight, and a rear frame 13 formed with a metal or the like is disposed at the reflection surface side of the backlight, so that the backlight is held by the frame 3 and the rear frame 13. In addition, a front frame 12 formed with a metal or the like is disposed at a display surface side (upper side in the figure) of the liquid crystal display panel 10, so that the liquid crystal display panel 10 is held by the frame 3 and the front frame 12.

The lamp unit 2 includes a lamp holder 4, an LED 7 which becomes a light source, a flexible cable 8 where the LED 7 is mounted, a shielding sheet 5, and the like. The lamp unit 2 includes a mechanism which slides the lamp unit 2 on the side surface of the backlight so as to be capable of being inserted and removed. The lamp holder 4 is formed by bending a metal plate made of a metal material such as stainless steel, copper, or aluminum so that the cross section thereof has a U-shape (surface facing the side surface of the light guide plate is opened), and the lamp holder 4 is processed so that the upper end portion of the U-shaped lamp holder 4 does not overlap with the light emitting surface of the light guide plate 1 when viewed from the normal direction of the light guide plate 1. The flexible cable 8 is fixed on an inner surface of the lamp holder 4 by a double-sided tape or the like, and the LED 7 is fixed thereon.

In the embodiment, the shielding sheet 5 is fixed on the upper outer surface of the U-shaped lamp holder 4 (the light emitting surface side of the light guide plate 1) by a double-sided tape, an adhesive, or the like, so as to project from the lamp holder 4. The shielding sheet 5 is formed with a flexible material which is a soft material (material softer than the light guide plate 1) such as PET or Teflon® resin and has some degree of a light shielding property and can be easily deformed. In addition, the shielding sheet 5 is formed to have such dimensions that a tip portion of the shielding sheet 5 projecting from the lamp holder 4 covers the end portion of the light emitting surface of the light guide plate 1 and does not overlap with the optical sheet 9 disposed on the light guide plate 1.

If the shielding sheet 5 is formed with a material having a good reflection efficiency (for example, a material where a thin metal film is formed on the surface thereof), the light emitted from the LED 7 can be efficiently guided to the light guide plate 1. If the shielding sheet 5 is formed with a material having a good light-shielding property (for example, a material where a pigment is mixed), the light leakage from the side surface of the light guide plate 1 is decreased, so that the display quality can be improved.

In addition, the shielding sheet 5 may be formed in a stacked structure of two or more layers. For example, in the shielding sheet 5, the layer in contact with the light emitting surface of the light guide plate 1 may be formed with a material softer than the light guide plate 1, and the other layer may be formed with a material having a good reflection efficiency or a material having a good light-shielding property. In addition, in the shielding sheet 5, the layer in contact with the light emitting surface of the light guide plate 1 may be formed with a material softer than the light guide plate 1, and the other layer may be formed with a material having tension. In this configuration, since the shape of the shielding sheet 5 can be somewhat maintained, the replacement work of the lamp unit 2 can be easily performed. In addition, in the shielding sheet 5, the layer in contact with the light emitting surface of the light guide plate 1 may be formed with a material softer than the light guide plate 1, and the other layer may be formed with a material having elasticity. In this configuration, since the light emitting surface of the light guide plate 1 can be pressed by the shielding sheet 5 using the elasticity, the adhesion to the light emitting surface of the light guide plate 1 can be increased, and the deformation of the light guide plate 1 can be suppressed.

In addition, the frame 3 disposed between the liquid crystal display panel 10 and the backlight is formed so as to overlap with the end portion of the light emitting surface of the light guide plate 1 when viewed from the normal direction of the light emitting surface. Also, the convex portion or protrusion (rib 6) projecting toward the light emitting surface of the light guide plate 1 is provided at the position of the frame 3 facing the end portion of the light emitting surface of the light guide plate 1 (refer to the area indicated by the broken line in the figure). Further, the tip portion of the shielding sheet 5 projecting from the lamp holder 4 is pressed by the rib 6 of the frame 3 so as to be closely attached to the light emitting surface of the light guide plate 1. Although the shape of the cross section of the rib 6 is semicircular in FIG. 5, the shape of the rib 6 is not particularly limited, but a trapezoidal shape or the like may be used. In addition, the rib may have a cavity formed in an inner portion thereof so as to have elasticity, so that the shielding sheet 5 may be appropriately pressed toward the light emitting surface of the light guide plate 1.

FIG. 6 is a perspective view illustrating an example of a structure of the frame 3. The frame 3 includes a guide mechanism 14 for inserting and removing the lamp unit 2 with respect to the side surface of the backlight by sliding the lamp unit 2. More specifically, the surface of the U-shaped lamp holder 4 on which the shielding sheet 5 is fixed is allowed to be slid into a recess between a sidewall 3a of the frame 3 and the rib 6 in the direction of the arrow in the figure, so that the lamp unit 2 can be inserted.

In addition, the portion of the frame 3 corresponding to the portion where the lamp unit 2 is disposed overlaps with the light emitting surface of the light guide plate 1, and in the overlapping portion, the rib 6 having a length (vertical length in the figure) substantially equal to or larger than the dimensions of the light guide plate 1 is provided on the surface of the frame 3 facing the light guide plate 1. A space between the rib 6 provided in the frame 3 and the light emitting surface of the light guide plate 1 is set to the dimensions having clearance larger than the thickness of the shielding sheet 5 which is fixed to the outer surface of the lamp holder 4. The outer surface of the lamp holder 4 to which the shielding sheet 5 is fixed has a positional relationship that the outer surface is farther from the light emitting surface of the light guide plate 1 than the tip portion of the rib 6 provided in the frame 3, that is, the portion of the frame 3 in which the distance from the light guide plate 1 is shortest. If the shielding sheet 5 can be easily deformed, the thickness thereof is not particularly limited as long as within the above-described range.

If the lamp unit 2 having the above-described structure is inserted from the side surface of the backlight by sliding the lamp unit 2, the shielding sheet 5 adhered to the lamp holder 4 of the lamp unit 2 is bent toward the light emitting surface of the light guide plate 1 by the rib 6 provided in the frame 3, so that the shielding sheet 5 is closely attached to the light emitting surface of the light guide plate 1. At this time, since the shielding sheet 5 is formed by using a material which is softer (has a lower hardness) than the light guide plate 1, the light guide plate 1 is not scraped; and even in a case where the deformation such as warp occurs in the light guide plate 1, since the shielding sheet 5 is deformed according to the deformation of the light guide plate 1, the state that the shielding sheet 5 is closely attached to the light emitting surface of the light guide plate 1 can be maintained.

In this manner, in the structure of the embodiment, since the lamp holder 4 is not in direct contact with the light guide plate 1, the occurrence of the scraped fragments of the light guide plate 1 due to the sliding of the lamp holder 4 can be prevented in advance. In addition, since the rib 6 is provided in the frame 3, the adhesion between the shielding sheet 5 and the light guide plate 1 can be ensured without gluing, and since the lamp unit 2 can be replaced by sliding, the replacement work of the lamp unit 2 can be easily performed.

In addition, by setting the dimensions so that the tip portion of the shielding sheet 5, in which the adhesion to the light guide plate 1 is ensured, does not overlap with the optical sheet 9 (namely, by disposing the optical sheet 9 in the area excluding the end portion of the light guide plate 1 so that the shielding sheet 5 is closely attached to the end portion of the light emitting surface of the light guide plate 1), a deterioration in display quality caused by direct transmission of the light inappropriately emitted from a gap between the light guide plate 1 and the LED 7 as a light source through the display area of the liquid crystal display panel 10 can be suppressed, and the occurrence of localized contrast generated by direct incidence of the inappropriately-emitted light on the optical sheet 9 having a lens-shaped function can be prevented.

In addition, since the sheet having a good reflection efficiency is used as the shielding sheet 5 in which the adhesion to the light guide plate 1 is ensured, a loss of light occurring between the light guide plate 1 and the light source unit is reduced, so that the efficiency of light incidence on the light guide plate 1 can be improved. In addition, since the light guide plate 1 and the shielding sheet 5 can be more securely closely attached to each other by the rib 6 provided in the frame 3, a decrease in luminance caused by the position shift of the LED and the side surface of the light guide plate in the thickness direction can be suppressed, and a deterioration in display quality can be prevented.

(Embodiment 2)

Figure 7:
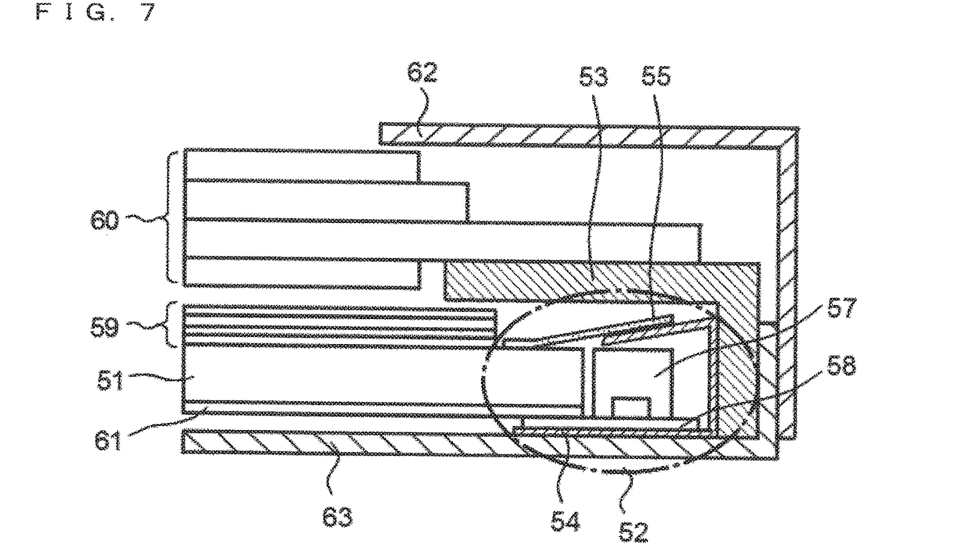
FIG. 7 is a sectional view illustrating a structure of a light source unit of a planar light source device according to Embodiment 2.

The following will describe a planar light source device and a liquid crystal display apparatus according to Embodiment 2 with reference to FIG. 7.

FIG. 7 is a sectional view illustrating a structure of a light source unit of a planar light source device according to Embodiment 2. In the same manner as Embodiment 1, the liquid crystal display panel 60 is configured with a TFT substrate and a CF substrate sandwiching a liquid crystal layer, polarizing plates disposed at both outer sides of a pair of the substrates, and the like. In addition, the backlight includes: a light guide plate 51; a reflection sheet 61 disposed at a reflection surface side of the light guide plate 51 (lower side in the figure); an optical sheet 59 including a diffusion sheet, a lens sheet and the like, disposed at the light emitting surface side of the light guide plate 51 (upper side in the figure); and a lamp unit 52 disposed at the side surface of the light guide plate 51 (refer to the inside of an area indicated by an alternate long and short dashed line in the figure). In addition, a frame 53 is disposed at the light emitting surface side of the backlight, and a rear frame 63 is disposed at the reflection surface side of the backlight, so that the backlight is held by the frame 53 and the rear frame 63. In addition, a front frame 62 is disposed at a display surface side (upper side in the figure) of the liquid crystal display panel 60, so that the liquid crystal display panel 60 is held by the frame 53 and the front frame 62.

A lamp unit 52 is configured to include a lamp holder 54, an LED 57 which becomes a light source, a flexible cable 58 on which the LED 57 is mounted and which is adhered to be fixed on an inner surface of the lamp holder 54, a shielding sheet 55, and the like. In the same manner as Embodiment 1 (FIG. 6), a frame 53 includes a guide mechanism for inserting and removing the lamp unit 52 with respect to the side surface of the backlight by sliding the lamp unit 52 along the sidewall of the backlight.

In the embodiment, the lamp holder 54 includes an inclined portion so that a tip portion extending from one of the outer surfaces thereof (upper surface in the figure) intersects with the end portion of the light emitting surface of the light guide plate 51. The end portion of the inclined portion is processed so as not to overlap with the light emitting surface of the light guide plate 51 when viewed from the normal direction of the light guide plate 51. In addition, although the entire upper portion of the lamp holder 54 is allowed to be inclined so as to intersect with the end portion of the light emitting surface of the light guide plate 51 in the figure, at least the portion where the shielding sheet 55 is to be adhered may be inclined so as to intersect with the end portion of the light emitting surface of the light guide plate 51.

In addition, the shielding sheet 55 is fixed on the inclined surface of the upper portion of the lamp holder 54 by a double-sided tape, an adhesive, or the like, so as to project from the lamp holder 54. In the same manner as Embodiment 1, the shielding sheet 55 is formed with a flexible material which is a soft material (material softer than the light guide plate 51) such as PET or Teflon® resin and has some degree of a light shielding property and can be easily deformed. In addition, the shielding sheet 55 is formed to have such dimensions that a tip portion of the shielding sheet 55 projecting from the lamp holder 54 covers the end portion of the light emitting surface of the light guide plate 51 and does not overlap with the optical sheet 59 disposed on the light guide plate 51.

If the lamp unit 52 having the above-described structure is inserted by sliding the lamp unit 52 with respect to the side surface of the backlight, the shielding sheet 55 adhered to the lamp holder 54 of the lamp unit 52 is extended along the inclined portion of the lamp holder 54 in the direction of the light emitting surface of the light guide plate 51, so that the shielding sheet 55 is closely attached to the light emitting surface of the light guide plate 51. At this time, since the shielding sheet 55 is formed by using a material which is softer (has a lower hardness) than the light guide plate 51, the light guide plate 51 is not scraped; and even in a case where the deformation such as warp occurs in the light guide plate 51, since the shielding sheet 55 is deformed according to the deformation of the light guide plate 51, the state that the shielding sheet 55 is closely attached to the light emitting surface of the light guide plate 51 can be maintained.

In this manner, in the structure of the embodiment, since the lamp holder 54 is not in direct contact with the light guide plate 51, the occurrence of the scraped fragments of the light guide plate 51 due to the sliding of the lamp holder 54 can be prevented in advance. In addition, the adhesion between the shielding sheet 55 and the light guide plate 51 can be ensured without gluing, and since the lamp unit 52 can be replaced by sliding, the replacement work of the lamp unit 52 can be easily performed.

In addition, by setting the dimensions so that the tip portion of the shielding sheet 55, in which the adhesion to the light guide plate 51 is ensured, does not overlap with the optical sheet 59, a deterioration in display quality caused by direct transmission of the light inappropriately emitted from a gap between the light guide plate 51 and the LED 57 as a light source through the display area of the liquid crystal display panel 60 can be suppressed, and the occurrence of localized contrast generated by direct incidence of the inappropriately-emitted light on the optical sheet 59 having a lens-shaped function can be prevented.

In addition, in the embodiment, the surface of the lamp holder 54 where the shielding sheet 55 is to be adhered is inclined so as to intersect with the end portion of the light emitting surface of the light guide plate 51, and thus, although a convex portion or protrusion (rib) is not provided in the frame 53 unlike Embodiment 1, since the shielding sheet 55 can be closely attached to the light emitting surface of the light guide plate 51, the configuration can be simplified in comparison with the configuration of Embodiment 1.

In addition, since the sheet having a good reflection efficiency is used as the shielding sheet 55 in which the adhesion to the light guide plate 51 is ensured, a loss of light occurring between the light guide plate 51 and the light source unit is reduced, so that the efficiency of light incidence on the light guide plate 51 can be improved.

(Embodiment 3)

Figure 8:
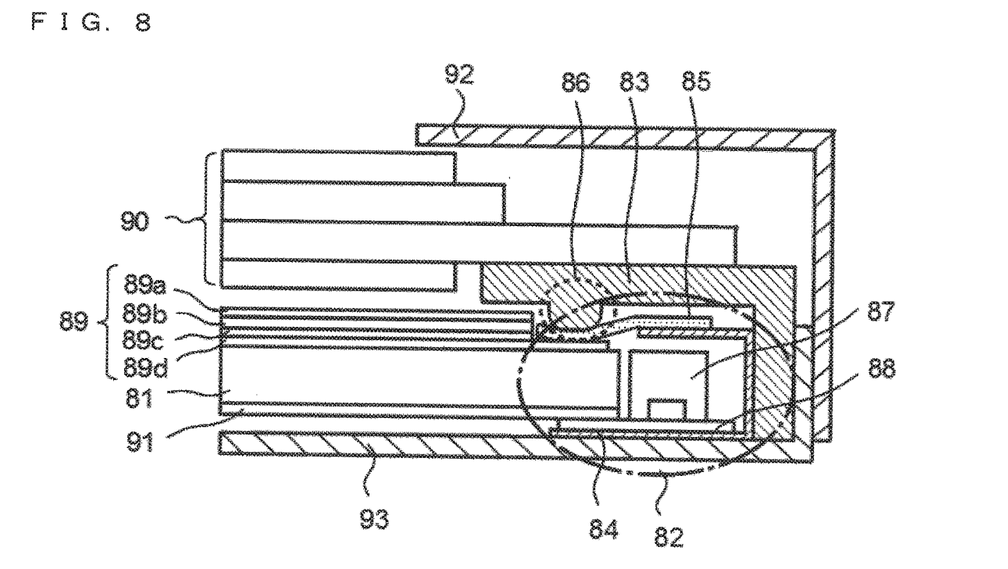
FIG. 8 is a sectional view illustrating a structure of a light source unit of a planar light source device according to Embodiment 3.

The following will describe a planar light source device and a liquid crystal display apparatus according to Embodiment 3 with reference to FIG. 8.

FIG. 8 is a sectional view illustrating a structure of a light source unit of a planar light source device according to Embodiment 3. In the same manner as Embodiment 1, the liquid crystal display panel 90 is configured with a TFT substrate and a CF substrate sandwiching a liquid crystal layer, polarizing plates disposed at both outer sides of a pair of the substrates, and the like. In addition, the backlight includes: a light guide plate 81; a reflection sheet 91 disposed at a reflection surface side of the light guide plate 81 (lower side in the figure); an optical sheet 89 disposed at the light emitting surface side of the light guide plate 81 (upper side in the figure); and a lamp unit 82 disposed at the side surface of the light guide plate 81 (refer to the inside of an area indicated by an alternate long and short dashed line in the figure). In addition, a frame 83 is disposed at the light emitting surface side of the backlight, and a rear frame 93 is disposed at the reflection surface side of the backlight, so that the backlight is held by the frame 83 and the rear frame 93. In addition, a front frame 92 is disposed at a display surface side (upper side in the figure) of the liquid crystal display panel 90, so that the liquid crystal display panel 90 is held by the frame 83 and the front frame 92.

An optical sheet 89 included in the backlight is configured to include optical sheets (diffusion sheets) 89*a* and 89*d* having a diffusion property for suppressing luminance irregularity of the light emitting surface of the backlight and optical sheets (lens sheets) 89*b* and 89*c* having a lens-shaped function in order to improve light emitting efficiency, and the like. In the embodiment, among the optical sheets 89, at least one optical sheet (diffusion sheet 89*d* in the figure) close to a light guide plate 81 is extended toward a lamp unit 82 to be disposed in the end portion of the light guide plate 81.

A lamp unit 82 is configured to include a lamp holder 84, an LED 87 which becomes a light source, a flexible cable 88 on which the LED 87 is mounted and which is adhered to be fixed on an inner surface of the lamp holder 84, a shielding sheet 85, and the like. In the same manner as Embodiment 1 (FIG. 3), a frame 83 includes a guide mechanism for inserting and removing the lamp unit 82 with respect to the side surface of the backlight by sliding the lamp unit 82.

In addition, the shielding sheet 85 is fixed on the outer surface of the lamp holder 84 by a double-sided tape, an adhesive, or the like, so as to project from the lamp holder 84. The shielding sheet 85 is formed with a flexible material which is a soft material (material softer than the light guide plate 81) such as PET or Teflon® resin and has some degree of a light shielding property and can be easily deformed. In addition, the shielding sheet 85 is formed to have such dimensions that a tip portion of the shielding sheet 85 projecting from the lamp holder 84 overlaps with the optical sheet 89 (diffusion sheet 89*d*) extending to the end portion of the light emitting surface of the light guide plate 81 and does not overlap with the other optical sheets 89*a*, 89*b* and 89*c*.

In addition, in a frame 83 disposed between a liquid crystal display panel 90 and the backlight, a convex portion or protrusion (rib 86) projecting toward the light emitting surface of the light guide plate 81 is provided at the position of the frame 83 facing the end portion of the light emitting surface of the light guide plate 81, and a tip portion of the shielding sheet 85 projecting from the lamp holder 84 is pressed by a rib 86 of the frame 83 to the optical sheet 89 (diffusion sheet 89*d*) extending to the end portion of the light emitting surface of the light guide plate 81 so as to be closely attached to the optical sheet 89.

If the lamp unit 82 having the above-described structure is inserted by sliding the lamp unit 82 with respect to the side surface of the backlight, the shielding sheet 85 adhered to the lamp holder 84 of the lamp unit 82 is bent toward the light emitting surface of the light guide plate 81 by the rib 86 provided in the frame 83, so that the shielding sheet 85 is closely attached to the light emitting surface of the optical sheet 89 (diffusion sheet 89*d*). Namely, when viewed from the normal direction of the light emitting surface of the light guide plate 81, the end portion of the shielding sheet 85 is disposed to overlap with the optical sheet 89 (diffusion sheet 89*d*). At this time, since the shielding sheet 85 is not in direct contact with the light guide plate 81, the light guide plate 81 is not scraped, and even in a case where the deformation such as warp occurs in the light guide plate 81 or the optical sheet 89, since the shielding sheet 85 is deformed according to the deformation, the state that the shielding sheet 85 is closely attached to the light emitting surface of the optical sheet 89 (diffusion sheet 89*d*) can be maintained.

In this manner, in the structure of the embodiment, since the lamp holder 84 is not in direct contact with the light guide plate 81, the occurrence of the scraped fragments of the light guide plate 81 due to the sliding of the lamp holder 84 can be prevented in advance. In addition, since the rib 86 is provided in the frame 83, the adhesion between the shielding sheet 85 and the light guide plate 81 can be ensured without gluing, and since the lamp unit 82 can be replaced by sliding, the replacement work of the lamp unit 82 can be easily performed.

In addition, by ensuring the adhesion between the light guide plate 81 and the diffusion sheet 89*d*, since only the light transmitting through the diffusion sheet 89*d* among the light emitted from the LED 87 as a light source transmits through the light emitting surface of the backlight, a deterioration in display quality caused by direct transmission through the display area of the liquid crystal panel 90 can be suppressed, and the occurrence of localized contrast generated by direct incidence of the inappropriately-emitted light on the optical sheets 89*b* and 89*c* having a lens-shaped function can be prevented.

In addition, since the sheet having a good reflection efficiency is used as the shielding sheet 85 in which the adhesion to the light guide plate 81 is ensured, a loss of light occurring between the light guide plate 81 and the light source unit is reduced, so that the efficiency of light incidence on the light guide plate 81 can be improved. In addition, since the light guide plate 81 and the shielding sheet 85 can be more securely closely attached to each other by the rib 86 provided in the frame 83, a decrease in luminance caused by the position shift of the LED and the side surface of the light guide plate in the thickness direction can be suppressed, and a deterioration in display quality can be prevented. The configuration of Embodiment 3 can also be applied to the aspect of Embodiment 2.

The present invention is not limited to the above-described embodiments, but configurations and arrangement of a planar light source device, particularly, a shape, arrangement, a material, and the like of a shielding sheet may be appropriately changed without departing from the spirit of the invention.

The present invention can be used for a planar light source device of converting light emitted from a light emitting element such as an LED into planar light and emitting the planar light, particularly, a planar light emitting device used as a backlight of an LCD.

As this description may be embodied in several forms without departing from the spirit of essential characteristics thereof, the present embodiments are therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

It is noted that, as used herein and in the appended claims, the singular forms "a", "an", and "the" include plural referents unless the context clearly dictates otherwise.

The invention claimed is:

1. A planar light source device comprising:
a light guide plate having an end portion, a light emitting surface, and a side surface;
a lamp unit which is disposed replaceably at the side surface of the light guide plate, the lamp unit including
a lamp holder having a shape where a surface facing the side surface of the light guide plate is opened, the lamp holder being formed so that an upper portion located close to the light emitting surface of the light guide plate does not overlap with the light emitting surface of the light guide plate when viewed from a normal direction of the light emitting surface of the light guide plate, a light source, a flexible cable on which the light source is mounted and which is adhered to be fixed on an inner surface of the lamp holder, and a shielding sheet which is adhered to be fixed on an outer surface of the lamp holder, the shielding sheet being formed with a material softer than the light guide plate, one end of the shielding sheet being fixed to the upper portion of the lamp holder, the other end thereof being closely attached to the light emitting surface of the light guide plate; and a frame that covers the end portion of the light guide plate and the lamp unit from the light emitting surface of the light guide plate, the frame including a guide mechanism that allows the lamp unit to slide along the side surface of the light guide plate, wherein the lamp unit is slidable along the side surface of the light guide plate together with the shielding sheet, the shielding sheet sliding in a state in which the other end of the shielding sheet is closely attached to the light emitting surface of the light guide plate without scraping the light emitting surface of the light guide plate.

2. The planar light source device according to claim 1, wherein the frame is formed to overlap with the end portion of the light emitting surface of the light guide plate when viewed from the normal direction of the light emitting surface, and a convex portion projecting toward the light emitting surface and extending along the end portion of the light guide plate is formed in a portion where the frame overlaps with the light emitting surface, and wherein the shielding sheet is pressed by the convex portion to be closely attached to the light emitting surface of the light guide plate.

3. The planar light source device according to claim 2, wherein the convex portion is formed so that an interval between a top portion of the convex portion and the light emitting surface of the light guide plate is larger than a thickness of the shielding sheet.

4. The planar light source device according to claim 1, wherein the upper portion of the lamp holder is inclined so that an extension line thereof intersects with the light emitting surface, and wherein the shielding sheet is fixed to the inclined upper portion to be closely attached to the light emitting surface of the light guide plate.

5. The planar light source device according to claim 1, wherein at least one optical sheet is disposed on the light emitting surface of the light guide plate, wherein the optical sheet is disposed in an area excluding the end portion of the light guide plate, and wherein the shielding sheet is disposed so that the other end of the shielding sheet does not overlap with the optical sheet when viewed from the normal direction of the light emitting surface.

6. The planar light source device according to claim 1, wherein at least one optical sheet is disposed on the light emitting surface of the light guide plate, wherein a specific optical sheet among the at least one optical sheet is disposed up to the end portion of the light guide plate, and wherein the shielding sheet is disposed so that the other end of the shielding sheet overlaps with the specific optical sheet when viewed from the normal direction of the light emitting surface.

7. The planar light source device according to claim 1, wherein the shielding sheet is formed with a material capable of shielding or reflecting light emitted from the light source.

8. A liquid crystal display apparatus comprising:

the planar light source device according to claim 1; and a liquid crystal display panel disposed at the light emitting surface side of the light guide plate of the planar light source device.

9. A planar light source device comprising:

a deformed light guide plate having an end portion, a light emitting surface, and a side surface;

a lamp unit which is disposed replaceably at the side surface of the light guide plate, the lamp unit including a metal lamp holder having a shape where a surface facing the side surface of the light guide plate is opened, the metal lamp holder being formed so that an upper portion located close to the light emitting surface of the light guide plate does not overlap with the light emitting surface of the light guide plate when viewed from a normal direction of the light emitting surface of the light guide plate, a light source, a flexible cable on which the light source is mounted and which is adhered to be fixed on an inner surface of the lamp holder, and a shielding sheet made of resin which is adhered to be fixed on an outer surface of the lamp holder, the shielding sheet being formed with a material softer than the light guide plate, one end of the shielding sheet being fixed to the upper portion of the lamp holder, the other end thereof being closely attached to the light emitting surface of the light guide plate; and a frame that covers the end portion of the light guide plate and the lamp unit from the light emitting surface of the light guide plate, the frame including a guide mechanism that allows the lamp unit to slide along the side surface of the light guide plate, wherein the lamp unit is slidable along the side surface of the light guide plate together with the shielding sheet, the shielding sheet sliding in a state in which the other end of the shielding sheet is closely attached to the light emitting surface of the light guide plate without scraping the light emitting surface of the light guide plate.

* * * * *